United States Patent [19]

Arioka et al.

[11] Patent Number: 4,828,899

[45] Date of Patent: * May 9, 1989

[54] MAGNETIC RECORDING MEDIUM AND RECORDING/REPRODUCING METHOD THEREOF

[75] Inventors: Hiroyuki Arioka; Masaharu Nishimatsu; Suguru Takayama, all of Tokyo, Japan

[73] Assignee: TDK Corporation, Tokyo, Japan

[*] Notice: The portion of the term of this patent subsequent to Oct. 18, 2005 has been disclaimed.

[21] Appl. No.: 127,568

[22] Filed: Dec. 2, 1987

Related U.S. Application Data

[63] Continuation of Ser. No. 22,537, Mar. 4, 1987, abandoned, which is a continuation of Ser. No. 757,453, Jul. 22, 1985, abandoned.

[30] Foreign Application Priority Data

Aug. 2, 1984 [JP] Japan .................. 59-163250

[51] Int. Cl.$^4$ ............................................. G11B 5/64
[52] U.S. Cl. ..................... 428/143; 427/131; 427/132; 428/141; 428/323; 428/694; 428/900
[58] Field of Search ............... 428/141, 323, 694, 695, 428/900; 427/128, 132, 131

[56] References Cited

U.S. PATENT DOCUMENTS

| | | | |
|---|---|---|---|
| 4,452,863 | 6/1984 | Takizawa et al. | 428/423.7 |
| 4,486,500 | 12/1984 | Naruo et al. | 427/44 |
| 4,511,635 | 4/1985 | Nagao et al. | 427/132 |
| 4,565,734 | 1/1986 | Arai et al. | 427/132 |
| 4,578,729 | 3/1986 | Suzuki et al. | 427/128 |
| 4,645,703 | 2/1987 | Suzuki et al. | 427/128 |

FOREIGN PATENT DOCUMENTS

| | | |
|---|---|---|
| 39-25246 | 11/1964 | Japan . |
| 53-116115 | 10/1978 | Japan . |
| 58-68227 | 4/1983 | Japan . |
| 58-100221 | 6/1983 | Japan . |

Primary Examiner—Paul J. Thibodeau
Attorney, Agent, or Firm—Oblon, Fisher, Spivak, McClelland & Maier

[57] ABSTRACT

A magnetic recording medium comprising a ferromagnetic metal thin film layer primarily based on cobalt and formed on the surface of a flexible substrate, and an organic topcoat layer containing a radiation curable compound having a molecular weight of less than 2,000, an anti-oxidant, and a lubricant on the surface of the metal thin film layer is provided with protrusions on its surface at an average density of at least $10^5/a^2$ per square millimeter of the surface, the protrusions having a height of 30 to 300 Å where a is the distance of a gap in a magnetic head across which the medium is passed in recording/reproducing operation.

9 Claims, 1 Drawing Sheet

MAGNETIC RECORDING MEDIUM AND RECORDING/REPRODUCING METHOD THEREOF

This is an continuation of Ser. No. 022,537 filed Mar. 4, 1987, now abandoned which in turn is a continuation of Ser. No. 757,453 filed July 22, 1985, and now abandoned.

BACKGROUND OF THE INVENTION

This invention relates to magnetic recording media, and more particularly, to magnetic recording media of metal thin film type, and a method for conducting recording/ reproducing operation in such media.

Among magnetic recording media for use in video, audio and other applications, active research and development works have been made on magnetic recording media, usually magnetic tapes having a magnetic layer in the form of a continuous thin film because of the compactness of a roll of tape. s metal The preferred magnetic layers for such continuou film type media are deposited films of Co, Co—Ni, Co—O, Co—Ni—O and similar systems formed by the so-called oblique incidence evaporation process in which cobalt and optional elements are evaporated in vacuum and directed at a given angle with respect to the normal to the substrate because such evaporated films exhibit superior characteristics. These media should have a flat surface because of remarkable deterioration of their properties due to a spacing loss. However, as the surface becomes flatter, the friction becomes greater adversely affecting head contact and transport movement.

Usually, the metal thin film type media have a magnetic layer as thin as 0.05 to 0.5 $\mu$m so that the surface property of the media depends on the surface property of the substrate For example, Japanese Patent Application Kokai No. 53-116115 discloses the provision of gently sloping protrusions in the form of creases or wrinkles on the substrate surface. Also, Japanese Patent Application Kokai Nos. 58-68227 and 58-100221 disclose the location of fine particles on the substrate surface, resulting in surface irregularities observable under an optical microscope with a magnifying power of 50 to 400 and actually measureable for height by means of a probe surface roughness meter. These media are, however, still insufficient in physical properties such as dynamic friction, runnability (the durability of tape which travels in frictional contact with rigid members in a recording machine), and moving stability as well as in electromagnetic properties Further, Japanese Patent Publication No. 39-25246 discloses the application of an organic lubricant on the surface of a ferromagnetic metal thin film layer as a topcoat layer for the purpose of reducing dynamic friction. The use of lubricant has the actually undesirable problem that it tends to adhere to the associated head to eventually block the head gap. At present, a technique for improving the surface properties of a metal thin film type magnetic recording medium has not been established which can reduce dynamic friction and eliminate head adhesion accompanied by head gap blocking without interfering smooth movement or adversely affecting electromagnetic properties.

SUMMARY OF THE INVENTION

It is, therefore, an object of the present invention to provide an improved metal thin film type magnetic recording medium which has eliminated head adhesion and head gap blocking without adversely affecting electromagnetic properties while exhibiting satisfactory physical properties including friction, runnability and movement stability.

It is another object of the present invention to provide a method for conducting recording/reproducing operation on such a magnetic recording medium.

According to a first aspect of the present invention, there is provided a magnetic recording medium comprising a flexible substrate having opposed major surfaces, a ferromagnetic metal thin film layer on one surface of the substrate primarily comprising cobalt, and an organic topcoat layer on the surface of the metal thin film layer. The magnetic recording medium is used in combination with a magnetic head having a gap. According to the feature of the present invention, the organic topcoat layer contains a radiation-curable compound having a molecular weight of less than 2,000, an anti-oxidant, and a lubricant. The metal thin film layer contains oxygen. The medium has protrusions on its surface at an average density of at least $10^5/a^2$ per square millimeter of the surface, the protrusions having a height of 30 to 300 Å, where a is the distance of the magnetic head gap as expressed in $\mu$m.

According to a second aspect of the present invention, there is provided a method for conducting recording/ reproducing operation on a magnetic recording medium comprising a flexible substrate having opposed major surfaces, a ferromagnetic metal thin film layer on one surface of the substrate principally comprising cobalt, and an organic topcoat layer on the surface of the metal thin film layer by passing the medium across a magnetic head having a gap, the improvement wherein the organic topcoat layer contains a radiation curable compound having a molecular weight of less than 2,000, an anti-oxidant, and a lubricant; the metal thin film layer contains oxygen, and the medium has in average at least $10^5/a^2$ protrusions per square millimeter of the surface, the protrusions having a height of 30 to 300 Å, where a is the distance of the magnetic head gap as expressed in $\mu$m.

BRIEF DESCRIPTION OF THE DRAWINGS

The above and other objects, features, and advantages of the present invention will be more fully understood by reading the following description when taken in conjunction with the accompanying drawings, in which.

It should be noted that the drawings are not drawn to scale and the components are diproportionately depicted for purposes of illustration.

DETAILED DESCRIPTION OF THE INVENTION

Figure 1:
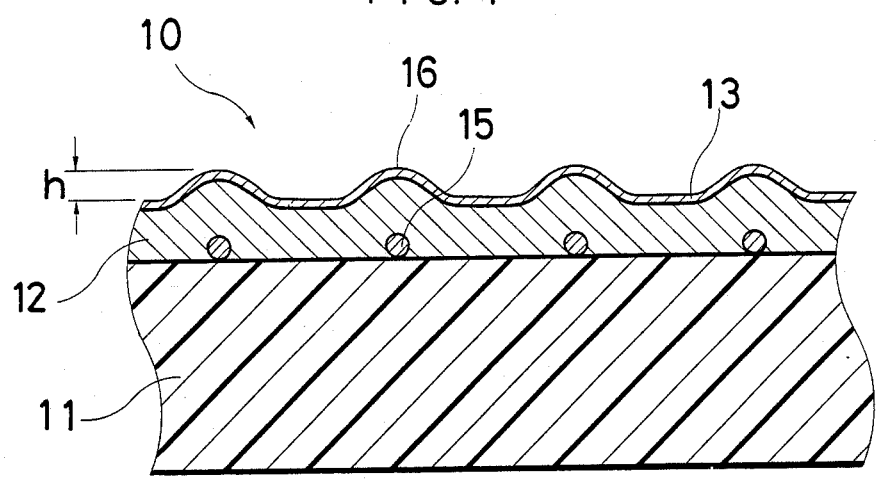
FIG. 1 is a cross-sectional view of a magnetic recording medium according to one embodiment of the present invention.

Referring to FIG. 1, there is illustrated a magnetic recording medium generally designated at 10 according to the present invention. The magnetic recording medium 10 includes a substrate 11 having opposed major surfaces, a ferromagnetic metal thin film layer 12 formed on one major surface of substrate 11, and a topcoat layer 13 on the surface of metal thin film layer 12. A backcoat layer may also be formed from any well-known composition on the other major surface of substrate 11 although the backcoat layer is not critical to the present invention. The medium 10 has randomly distributed protrusions or bosses 16 on the surface, preferably on the topcoat surface. These elements will be described in more detail hereinafter.

Substrate

The substrates on which the ferromagnetic metal thin film layer is formed are not particularly limited as long as they are non-magnetic. Particularly preferred are flexible substrates, especially, of resins, for example, polyesters such as polyethylene terephthalate and polyimides. They are not limited in shape, size, and thickness as long as they meet the intended application. Preferably, the substrates have a thickness of about 5 to 20 μm.

Protrusion

Fine protrusions or bosses 16 as shown in FIG. 1 have a height h of 30 to 300 Å, and more particularly, 50 to 250 Å. The protrusions provided in the present invention have such dimensions that they are not observable under an optical microscope or measureable by a probe type surface roughness meter, but can only be observable under a scanning electron microscope. Larger protrusions in excess of 300 Å which are observable under an optical microscope are not desirable because of deterioration in electromagnetic properties and movement stability. Smaller protrusions of lower than 30 Å are not effective in improving physical properties.

Figure 2:
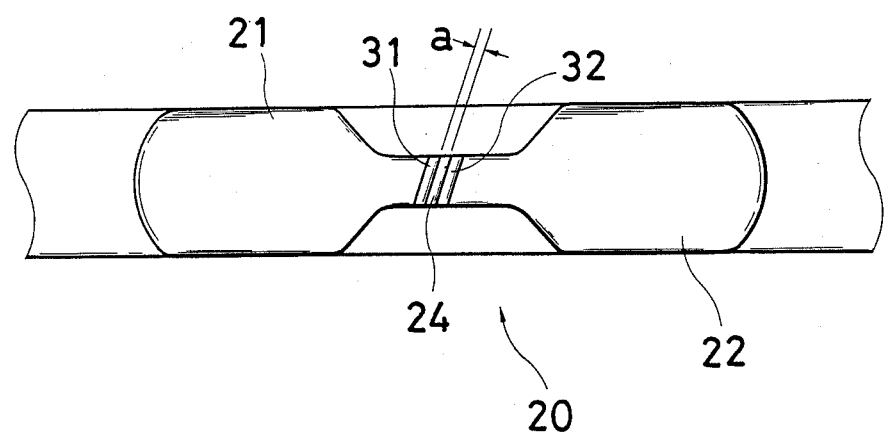
FIG. 2 is an elevation of one example of a magnetic head used in the method of the present invention.

The protrusions should be distributed on the surface of the magnetic recording medium at an average density of at least $10^5/a^2$, and more preferably $2\times10^6/a^2$ to $1\times10^9/a^2$ per squar millimeter of the surface. A magnetic head 20 with which the magnetic recording medium of the present invention is used is provided with a gap 24 having a distance a (as expressed in micronmeter) as shown in FIG. 2. The gap distance a usually ranges from 0.1 μm to 0.5 μm, and more preferably, from 0.1 μm to 0.4 μm. At protrusion densities of less than $10^5/a^2/mm^2$, and more particularly less than $2\times10^6/a^2/mm^2$, there result increased noise, deteriorated still performance, and other disadvantages, which are undesirable in practical aplications. Higher protrusion densities of more than $10^9/a^2/mm^2$ are rather less effective in improving physical properties.

The protrusions 16 may generally be provided by placing submicron particles 15 on the surface of the substrate as clearly shown in FIG. 1. The submicron particles used herein have a particle size of 30 to 300 Å, and more preferably 50 to 250 Å. Submicron protrusions are then formed on the topcoat surface of the magnetic recording medium which conform to the submicron particles on the substrate surface in shape and size.

The submicron particles used in the practice of the present invention are those generally known as colloidal particles. Examples of the prrticles which can be used herein include $SiO_2$ (colloidal silica), $Al_2O_3$ (alumina sol), $MgO$, $TiO_2$, $ZnO$, $Fe_2O_3$, zirconia, $CdO$, $NiO$, $CaWO_4$, $CaCO_3$, $BaCO_3$, $CoCO_3$, $BaTiO_3$, Ti (titanium black), Au, Ag, Cu, Ni, Fe, various hydrosols, and resinous particles. Inorganic particles are preferred among others.

The submicron particles may be placed on the substrate surface, for example, by dispersing them in a suitable solvent to form a dispersion, and applying the dispersion to the substrate followed by drying. Any aqueous emulsion containing a resinous component may also be added to the particle dispersion before it is applied to the substrate. The addition of a resinous component allows gently-sloping protrusions to form in conformity to the particles although it is not critical in the present invention.

Alternatively, the submicron particles may be contained in the topcoat layer to provide protrusions rather than the placement of particles on the substrate surface.

Maqnetic layer

The magnetic recording medium of the present invention has a magnetic layer on a substrate. The magnetic layer is of continuous ferromagnetic metal thin film type coextending over the substrate and is generally based on cobalt. In preferred embodiments of the present invention, the magnetic layer may preferably consist essentially of cobalt; cobalt and oxygen; cobalt, oxygen and nickel and/or chromium. That is, the magnetic layer may consist essentially of cobalt alone or a mixture of cobalt with nickel and/or oxygen.

Where the layer consists essentially of cobalt and nickel, the weight ratio of Co/Ni may preferably be at least about 1.5.

Better results are obtained when the ferromagnetic metal thin film layer contains chromium in addition to cobalt, or cobalt and nickel. The presence of chromium contributes to further improvements in electromagnetic characteristics, output level, signal-to-noise (S/N) ratio, and film strength. In this case, the weight ratio of Cr/Co (when nickel free) or Cr/(Co +Ni) is preferably in the range of about 0.001 to 0.1, and more preferably about 0.005 to 0.05.

The magnetic layer may further contain oxygen in addition to cobalt or cobalt and nickel and optionally chromium. The presence of oxygen contributes to further improvements in electromagnetic characteristics and runnability. In this case, the atomic ratio of O/Co (when nickel free) or O/(Co +Ni) is preferably not more than about 0.5, and more preferably from about 0.05 to 0.5.

On the surface of the ferromagnetic metal thin film layer, oxygen forms oxides with ferromagnetic metals Co and Ni. In Auger spectroscopy, peaks indicative of oxides appear in a surface layer, particularly in a surface layer from the surface to a depth of 50 to 500 Å, more preferably 50 to 200 Å. This oxide layer has an oxygen content of the order of 0.5 to 1.0 in atomic ratio. No particular limit is imposed on the concentration gradient of oxygen in the ferromagnetic metal thin film layer.

The ferromagnetic metal thin film layer may further contain trace elements, particularly transition metal elements, for example, Fe, Mn, V, Zr, Nb, Ta, Ti, Zn, Mo, W, Cu, etc.

The ferromagnetic metal thin film layer preferably consists of a coalescence of Co base particles of columnar structure oriented oblique to the normal to the substrate. More specifically, the axis of particles of columnar structure is preferably oriented at an angle of about 10 to 70 degrees with respect to the normal to the major surface of the substrate. Each columnar particle generally extends throughout the thickness of the thin film layer and has a minor diameter of the order of 50 to 500 angstroms. Cobalt and optional metals such as nickel and chromium form the columnar structure particles themselves while oxygen, when added, is generally present on the surface of each columnar structure particle in the surface layer essentially in the form of oxides. The ferromagnetic metal thin film layer generally has a thickness of about 0.05 to 0.5 $\mu$m, and preferably about 0.07 to 0.3 $\mu$m.

The magnetic layer is generally formed by the so-called oblique incidence evaporation process. The oblique incidence evaporation process may be any of well-known techniques preferably using an electron beam gun while the minimum incident angle with respect to the normal to the substrate is preferably 30 degrees. Evaporation conditions and post-treatments are well known in the art and any suitable ones may be selected therefrom. One effective post-treatment is a treatment for incorporating oxygen into the magnetic layer, which is also well known in the art. For further information about this evaporation process, reference should be made to D. E. Speliotis et al., "Hard magnetic films of iron, cobalt and nickel", *J. Aopl. Phys.*, 36, 3,972 (1965) and Y. Maezawa et al., "Metal thin film video tape by vacuum deposition", IERE Conference Proceedings 54 (The Fourth International Conference on Video and Data Recording, The University of Southanmpton, Hampshire, England, Apr. 20-23 1982), pp. 1-9.

The ferromagnetic metal thin film layer may be formed on the substrate either directly or via an undercoat layer of the well-known type. Further, the ferromagnetic metal thin film layer is generally formed as a single layer, but in some cases, it may be made up from a plurality of laminated sub-layers with or without an intermediate non-ferromagnetic metal thin film layer interposed therebetween.

The ferromagnetic metal thin film layer may be formed by any well-known techniques including evaporation, ion plating, and metallizing, and more preferably by the so-called oblique incidence evaporation process. The oblique incidence evaporation process may be any of well-known techniques preferably using an electron beam gun while the minimum incident angle with respect to the normal to the substrate is preferably at least 20 degrees. Incident angles of less than 20 degrees result in deteriorated electromagnetic properties. The evaporation atmosphere may generally be an inner atmosphere of argon, helium or vacuum containing oxygen gas at a pressure of about $10^{-5}$ to $10^0$ Pa. Those skilled in the art will readily select other evaporation parameters including source-substrate spacing, substrate feed direction, can and mask configurations and arrangement, and the like, through a simple experiment if necessary.

Evaporation in an oxygen-containing atmosphere causes a metal oxide film to form on the surface of the resulting magnetic layer. The partial pressure of oxygen gas necessary to allow for oxide formation may be readily determined through a simple experiment.

A metal oxide coating may be formed on the surface of the magnetic layer by an oxidizing treatment. Any of the following oxidizing treatments may be employed for this purpose.

(1) Dry treatment
 (a) Energy particle treatment
  Oxygen may be directed as energy particles to the magnetic layer at the final stage of evaporation process by means of an ion gun or neutron gun as described in Japanese Patent Application No. 58-76640.
 (b) Glow treatment
  The magnetic layer is exposed to a plasma which is created by generating a glow discharge in an atmosphere containing $O_2$, $H_2O$ or $O_2+H_2O$ in combination with an inert gas such as Ar and $N_2$.
 (c) Oxidizing gas
  An oxidizing gas such as ozone and heated steam is blown to the magnetic layer.
 (d) Heat treatment
  Oxidation is effected by heating at temperatures of about 60° to 150° C.
(2) Wet Treatment
 (a) Anodization
 (b) Alkali treatment
 (c) Acid treatment
  Chromate treatment, permanganate treatment, phosphate treatment
 (d) Oxidant treatment $H_2O_2$ Topcoat On the magnetic layer is formed a specific organic topcoat layer according to the present invention. The topcoat layer formed in the practice of the present invention contains a radiation-curable compound having a molecular weight of less than 2,000, an anti-oxidant and a lubricant. Prior art topcoat layers obtained by applying lubricant alone can only offer a temporary reduction of friction and are insufficient in rust prevention, corrosion prevention and durability.

The radiation curable compounds having a molecular weight of less than 2,000 used in the topcoat layer in the practice of the present invention include compounds of such a molecular weight having a group capable of crosslinking or polymerization upon exposure to radiation contained or incorporated in their molecule, for example, acrylic acid and methacrylic acid having an unsaturated double bond sensitive to ionization energy and capable of radical polymerization, compounds having an acrylic double bond such as esters of acrylic acid and methacrylic acid, compounds having an allyl double bond such as diallyl phthalate, and compounds having an unsaturated bond such as maleic acid and its derivatives.

The radiation curable compounds should have a molecular weight of less than 2,000. Examples of these compounds include styrene, ethyl acrylate, ethylene glycol diacrylate, ethlylene glycol dimethacrylate, diethylene glycol diacrylate, diethylene glycol dimethacrylate, 1,6-hexaneglycol diacrylate, 1,6-hexaneglycol dimethacrylate, etc. More preferred examples include N-vinyl pyrrolidone, pentaerythritol tetraacrylate (methacrylate), pentaerythritol triacrylate (methacrylate), trimethylolpropane triacrylate (methacrylate), trimethylolpropane diacrylate (methacrylate), polyfunctional oligoester acrylates (Aronix M-7100, M-5400, 5500, and 5700, manufactured by Toa Synthesis K.K.), acryl-modified products of urethane elastomers (Nippolane 4040, manufactured by Nihon Polyurethane K.K.), and derivatives thereof having a functional group such as COOH incorporated therein, acrylates (methacrylates) of phenol ethylene oxide adducts, and compounds comprising pentaerythrytol condensed rings of the following formula having an acryl or methacryl group or ε-caprolacton-acryl group.

tol condensates A, those where m=1, a=3, and b=3 are designated special pentaerythritol condensates B, those where m=1, a=6, and b=0 are designated special pentaerythritol condensates C, and those where

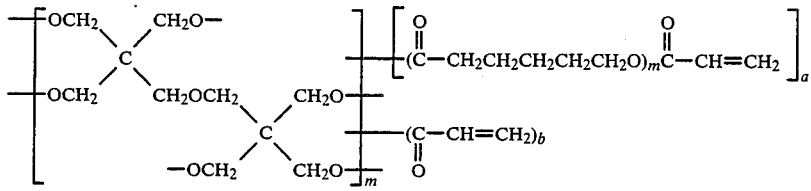

Those compounds having the above formula where m=1, a=2, and b=4 are designated special pentaerythritol condensates A, those where m=2, a=6, and b=0 are designated special pentaerythritol condensates D, hereinafter.

$(CH_2=CHCOOCH_2)_3-CCH_2OH$ (1)
(special acrylate A)

$(CH_2=CHCOOCH_2)_3-CCH_2CH_3$ (2)
(special acrylate B)

$[CH_2=CHCO-(OC_3H_6)_n-OCH_2]_3-CCH_2CH_3$ (3)
($n \approx 3$) (special acrylate C)

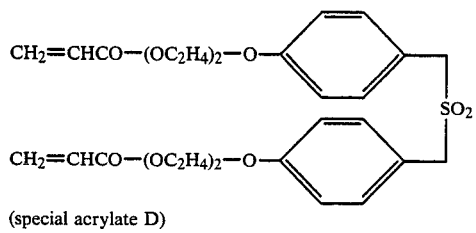 (4)

(special acrylate D)

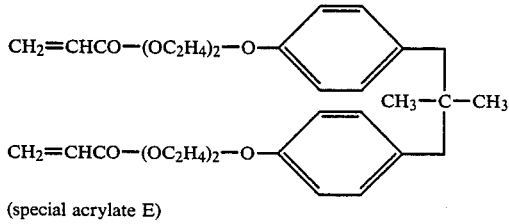 (5)

(special acrylate E)

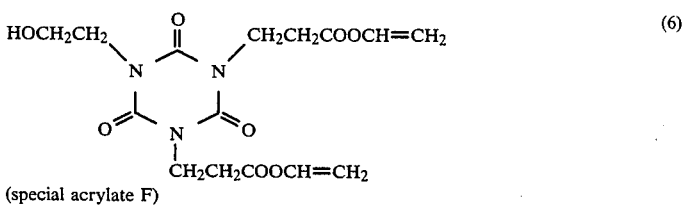 (6)

(special acrylate F)

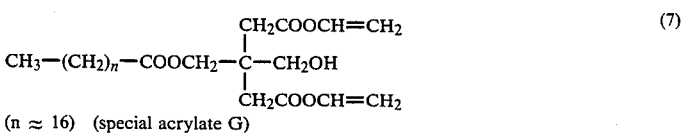 (7)

($n \approx 16$) (special acrylate G)

$CH_2=CHCOO-(CH_2CH_2O)_4-COCH=CH_2$ (8)
(special acrylate H)

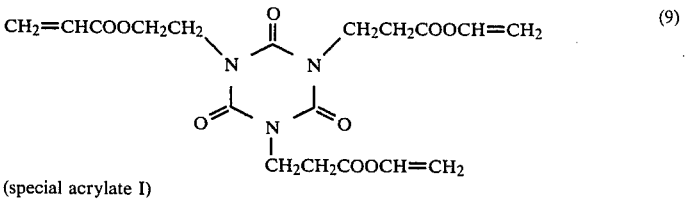 (9)

(special acrylate I)

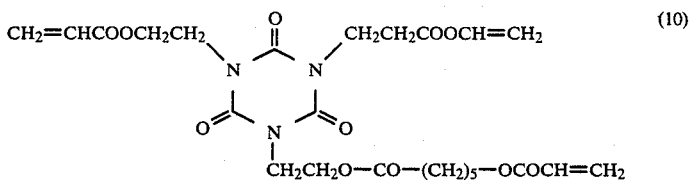

(special acrylate J)

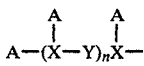

A: acrylic
X: polyhydric alcohol
Y: polybasic acid     (special acrylate K)

The use of the compounds having a molecular weight of less than 2,000 not only improves the adhesion of the topcoat layer to the magnetic layer, but also reinforces the topcoat layer, that is, increases the breakage strength and abrasion resistance of the topcoat layer, resulting in stable movement in high-temperature and high-humidity conditions. There is thus obtained a magnetic recording medium which is improved in dropout, head adhesion, topcoat abrasion, and friction variation with use.

In the absence of the radiation-curable compounds having a molecular weight of less than 2,000 in the topcoat layer, the movement of the resulting tape at elevated temperatures is often obstructed because the topcoat layer is severely abraded away to cause debris deposition on the head. The radiation-curable compounds having a molecular weight of less than 2,000 imparts an increased degree of crosslinking to the topcoat layer which is little abraded and causes little head clogging during operation, resulting in improved still properties.

The radiation-curable compounds having a molecular weight of less than 2,000 provide less abrasion and head clogging and better still properties as compared with radiationcurable polymers. Because of lower molecular weight and viscosity than polymers, these compounds allow the topcoat layer to be applied more uniformly, leading to improved envenlope in electromagnetic characteristics. Compounds having a molecular weight of less than 2,000 are used in the practice of the present invention because higher molecular weight compounds result in increased frictional resistance.

The use of radiation-curable binders having a molecular weight of less than 2,000 allows the topcoat to be continuously formed on a manufacturing line, contributing to energy and cost savings. These compounds may be used alone or in admixture of two or more.

Any anti-oxidants may be used herein as long as they can prevent oxidation of metals. The anti-oxidants used herein may be selected from conventional anti-oxidants which may be generally classified into the following groups:
(1) Phenolic anti-oxidants
(2) Amine anti-oxidants
(3) Phosphorous anti-oxidants
(4) Sulfur anti-oxidants
(5) Organic acid, alcohol and ester anti-oxidants
(6) Quinone anti-oxidants
(7) Inorganic acid and inorganic salt anti-oxidant Examples of each of these. anti-oxidants are shown below.

(1) Phenolic anti-oxidants
  2,6-di-tert-butyl-p-cresol,
  2,6-di-tert-butylphenol,
  2,4-dimethyl-6-tert-butylphenol, butylhydroxyanisole,
  2,2'-methylenebis(4-methyl-6-tert-butylphenol),
  4,4'-butylidenebis(3-methyl-6-tert-butylphenol),
  4,4'-thiobis(3-methyl-6-tert-butylphenol), tetrakis[-methylene-3-(3,5-di-tert-butyl-4-hydroxyphenyl)-propionate]methane,
  1,1,3-tris(2-methyl-4-hydroxy-5-tert-butylphenyl)butane,
  dibutylhydroxytoluene,
  propyl gallate,
  guaiacum resin,
  nordihydroguaiaretic acid, etc.

Also included are phenolic anti-oxidants of radiation curable type, for example, acrylate and methacrylate modified compounds of monoglycol salicylate, 2,5-di-tert-butylhydroquinone, 2,4-dihydroxybenzophenone, 2,4,5-trihydroxybutyrophenone, hydroquinone, etc.

(2) Amine anti-oxidants
  phenyl-β-naphthylamine,
  α-naphthylamine,
  N,N'-di-sec-butyl-p-phenylenediamine,
  phenothiazine,
  N,N'-diphenyl-p-phenylenediamine,
  alkanol amines,
  phospholipid, etc.

Also included are amine anti-oxidants of radiation curable type, for example, dimethylaminoethyl methacrylate and acrylate, and vinyl derivatives.

(3) Phosphorous anti-oxidants

Included are phosphate esters of both radiation curable and radiation uncurable types. The R moiety of phosphates may include alkyl radicals, alkyl phenyl radicals, ethylene oxide, propylene oxide, etc. and preferably contain 1 to 26 carbon atoms, and most preferably 1 to 22 carbon atoms. The phosphates include mono-, di-, and tri-esters and they may be used alone or in admixture. Mixtures comprising a major proportion of mono- and di-esters are preferred and the tri-esters may be excluded.

Also included in the phosphate esters are $NH_4$ type and methacrylate, acrylate, and vinyl modified types.

Illustrative examples include phosphites such as triphenyl phosphite, trioctadecyl phosphite, tridecyl phosphite, trilauryl trithiophosphite, etc.; hexamethyl phosphoric triamide, butyl phosphate, cetyl phosphate, butoxyethyl phosphate, 2-ethylhexyl phosphate, β-chloroethyl phosphate, butoxyethyl phosphate diethylamine salt, di(2-ethylhexyl) phosphate, ethyleneglycol acid phosphate; methacrylate and acrylate phosphates such as 2-hydroxyethylmethacrylate phosphate, butylhydroxymethacrylate phosphate, caprylhydroxylmethacrylate phosphate, myristylhydroxymethacrylate phosphate, stearylhydroxymethacrylate phosphate, cetylhydroxymethacrylate phosphate, butylphenylhydroxymethacrylate phosphate, amylphenylhydroxymethacrylate phosphate, nonylphenylhydroxymethacrylate phosphate, and similar acrylate phosphates; phenyl phosphates such as phenyl phosphate and nonyl phosphate; alcoholic phosphates; vanadium series acidic phosphates, and the like.

The phosphate esters may be prepared by any well-known methods, for example, as disclosed in Japanese Patent Publication No. 57-44223.

(4) Sulfur anti-oxidants
  dilaurylthiodipropionate,
  distearylthiodipropionate,
  laurylstearylthiodipropio.nate,
  dimyristylthiodipropionate,
  distearyl-$\beta,\beta'$-thiobutyrate,
  2-mercaptobenzoimidazole,
  dilaurylsulfide, etc.

Also included are radiation curable methacrylate, acrylate, vinyl modified compounds of 4,4'-thio-bis(3-methyl-6-tertbutylphenol), 2,2'-thio-bis(4-methyl-6-tertbutylphenol), etc. They may further contain ethylene oxide and propylene oxide units.

(5) Orqanic acid, alcohol, and ester anti-oxidants

Included are sorbitol, glycerine, propylene glycol, adipic acid, citric acid, ascorbic acid, etc. as well as radiation curable derivatives thereof.

(6) Quinone anti-oxidants

Included are hydroquinone, tocopherol, etc. as well as radiation curable derivatives thereof.

(7) Inorqanic acid and inorqanic salt anti-oxidants

Phosphoric acid is a typical example.

In order to minimize the transfer of the topcoat substance to the back surface of the magnetic recording medium in a roll form, radiation curable anti-oxidants having an acrylic double bond in their molecule are preferred, for example, monoglycol salicylate methacylate and acrylate, 4-tert-butylcatechol methacrylate and acrylate, dimethylaminoethyl methacrylate and acrylate, ethylhydroxymethacrylate and acrylate phosphates, cetylhydroxyphosphate methacrylate and acrylate, stearyl methacrylate and acrylate phosphates, and phenyl derivatives of the foregoings, 2,2'-thio-bis(4-methyl-6-tert-butylphenol) methacrylate and acrylate, etc.

The radiation curable anti-oxidants can be on-line cured to the ferromagnetic thin film during manufacturing, eliminating the deterioration of surface properties or output reduction due to subsequent heat curing which makes a roll tighter to cause the conformity of the topcoat layer to the surface morphology of the back side.

The topcoat is formed on the ferromagnetic thin film to a thickness of 100 Å or less as will be described hereinafter. Thicker topcoats result in a loss of electromagnetic properties and can be abraded away during operation.

The use of the radiation curable anti-oxidants offers benefits in properties including prevention of dropouts and reduction of the output difference between outer and inner coils in a roll form, as well as the benefit of on-line production.

The lubricants used in the topcoat layer in the practice of the present invention may be conventional lubricants commonly used in prior art magnetic recording media, for example, silicone oil, fluorine oil, fatty acids, fatty acid esters, paraffins, liquid paraffins, and surface active agents, etc. Among others, preferred are fatty acids and/or fatty acid esters.

Examples of the fatty acids used herein include fatty acids having at least 12 carbon atoms, more illustratively, RCOOH where R is an alkyl having at least 11 carbon atoms, such as caprylic acid, capric acid, lauric acid, myristic acid, palmitic acid, stearic acid, behenic acid, oleic acid, elaidic acid, linolic acid, linoleic acid, stearolic acid, etc.

The fatty acid esters used herein may be those esters of monobasic fatty acids having 12 to 16 carbon atoms with monohydric alcohols having 3 to 12 carbon atoms, and those esters of monobasic fatty acids having at least 17 carbon atoms with monohydric alcohols, the esters having 21 to 23 carbon atoms in total.

The silicone oils used herein may be fatty acid-modified silicones and partially fluorine-modified silicones. The alcohols used herein may be higher alcohols. The fluorine compounds may be those obtained by electrolytic substitution, telomerization, and oligomerization.

Also, lubricants of radiation curable type may be used and preferred. The use of the radiation curable lubricants prevents the conformity of the topcoat layer to the surface morphology of the back side of the medium in a roll form and thus offers benefits in properties including prevention of dropouts and reduction of the output difference between outer and inner coils in a roll form, as well as the benefit of on-line production.

The radiation curable lubricants are compounds having a chain moiety capable of providing lubricity and an acrylic double bond in their molecule, for example, acrylates, methacrylates, vinyl acetates, acrylamides, vinyl alcohol esters, methylvinyl alcohol esters, allylalcohol esters, glycerides, etc.

These lubricants may be represented by the following structural formulas:

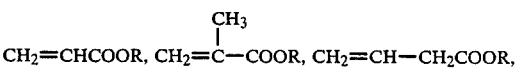

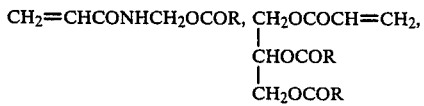

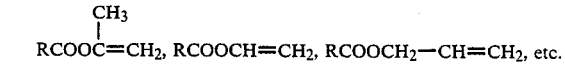

where R is selected from straight chain and branched, saturated and unsaturated, hydrocarbon radicals having at least 7 carbon atoms, preferably 12 to 23 carbon atoms. These compounds may be substituted with fluorine. The fluorine-substituted lubricants may be represented by the following structural formulas:

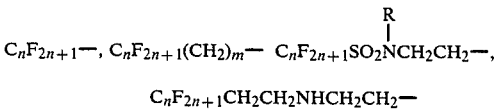

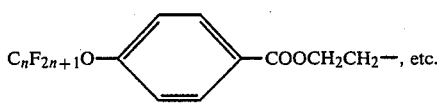

where m has a value from 1 to 5. Preferred examples of the radiation curable lubricants include stearic acid methacrylate and acrylate, methacrylate and acrylate of strearyl alcohol, glycerine methacrylate and acrylate, glycol methacrylate and acrylate, silicone methacrylate and acrylate, vinyl stearate, vinyl myristate, etc.

In addition to the above-mentioned additives, the topcoat layer may further contain polymers. The polymers used in the topcoat layers in the practice of the present invention may be selected from thermoplastic, thermosetting and reactive-type resins which have been commonly used in prior art magnetic recording media, and mixtures thereof. Among them, thermosetting resins, and especially radiation curable resins are preferred because of the strength of the resultant coating.

The thermoplastic resins used herein are resins having a softening point of lower than 150oC, an average molecular weight of 10,000 to 200,000, and a polymerization degree of about 200 to 2,000, for example, vinyl chloride-vinyl acetate copolymers (which may have carboxylic units incorporated therein), vinyl chloride-vinyl acetate-vinyl alcohol copolymers (which may have carboxylic units incorporated therein), vinyl chloride-vinylidene chloride copolymers, vinyl chloride-acrylonitrile copolymers, acrylate-acrylonitrile copolymers, acrylate-vinylidene chloride copolymers, acrylate-styrene copolymers, methacrylate-acrylonitrile copolymers, methacrylate-vinylidene chloride copolymers, methacrylate-styrene copolymers, urethane elastomers, nylon-silicon resins, nitrocellulose-polyamide resins, polyfluorovinyl resins, vinylidene chloride-acrylonitrile copolymers, butadiene-acrylonitrile copolymers, polyamide resins, polyvinyl butyral, cellulose derivatives (such as cellulose acetate, cellulose diacetate, cellulose triacetate, cellulose propionate, nitrocellulose, etc.), styrene-butadiene copolymers, polyester resins, chlorovinyl ether-acrylate copolymers, amino resins, various synthetic rubber series thermoplastic resins, and mixtures thereof.

The thermosetting and reactive-type resins are resins which have a molecular weight of less than 200,000 i solution form to be applied, and after being applied, dried, and heated, have an infinitely increased molecular weight as a result of condensation and addition reactions. Among them, preferred are those resins which do not soften or melt before they are pyrolyzed.

Illustrative of these resins are phenol resins, epoxy resins, polyurethane setting resins, urea resins, melamine resins, alkyd resins, silicone resins, acrylic reactive resins, epoxy-polyamide resins, nitrocellulose melamine resins, mixtures of high molecular weight polyester resins and isocyanate prepolymers, mixtures of methacrylate copolymers and diisocyanate prepolymers, mixtures of polyester polyols and polyisocyanates, urea-formaldehyde resins, low molecular weight glycol/high molecular weight diol/triphenylmethane triisocyanate mixtures, polyamine resins, and mixtures thereof.

Among them particularly preferred are thermosetting resin compounds comprising a cellulosic resin (nitrocellulose, etc.), a vinyl chloride-vinyl acetate-vinyl alcohol copolymer, and urethane with a curing agent added. Also preferred are radiation-curable resin compounds comprising a vinyl chloride-vinyl acetate-vinyl alcohol copolymer (which may have carboxylic units incorporated therein) or acrylic-modified vinyl chloride-vinyl acetate-vinyl alcohol copolymer (which may have carboxylic units incorporated therein) and urethane acrylate. In addition to the above preferred combinations, also preferred are those thermoplastic resins having contained or incorporated in their molecule radicals susceptible to crosslinking or polymerization upon exposure to radiation, for example, acrylic double bonds as given by acrylic and methacrylic acids having an unsaturated double bond capable of radical polymerization or esters thereof; allyl double bonds as given by diallyl phthalate; and unsaturated bonds as given by maleic acid and maleic derivatives.

Monomers which can be used as the binder component in the practice of the present invention include acrylic acid, methacrylic acid, and acrylamide.

Those binders having a double bond may be obtained by modifying various polyesters, polyols, polyurethanes and analogues with compounds having an acrylic double bond. If desired, polyhydric alcohols or polyhydric carboxylic acids may be blended to obtain compounds having varying molecular weights.

The foregoing examples are only a part of the radiation sensitive resins used herein. They may also be used alone or in admixture.

The preferred organic binder in the topcoat layer is a composition comprising (A) 20 to 70% by weight of a plastic compound having at least two radiation-curable unsaturated double bonds and a molecular weight of 5,000 to 100,000, (B) 20 to 80% by weight of a rubber-like compound having at least one radiation-curable unsaturated double bond or not being radiation curable and having a molecular weight of 3,000 to 100,000, and (C) 10 to 40% by weight of a compound having at least one radiation-curable unsaturated double bond and a molecular weight of 200 to 3,000. The topcoat obtained from this composition has improved breaking strength, reinforcement, and abrasion resistance. The release of inorganic filler particles from the topcoat layer to the magnetic layer is well precluded. A roll of the magnetic recording medium being taken up during manufacture is no longer tightened during curing process so that the medium has uniform properties in a lengthwise direction.

The topcoat layer containing the compound having a molecular weight of less than 2,000, anti-oxidant, and lubricant may be formed on the surface of the ferromagnetic thin film by any desired techniques, for example, by diluting the components in a solvent and thinly applying the resulting solution onto the ferromagnetic thin film, or by evaporating the components in air or inert gas or vacuum and directing the resulting vapor to the ferromagnetic thin film surface.

Various procedures may be taken, for example, by mixing the radiation-curable compound having a molecular weight of less than 2,000, antioxidant, and lubricant together, and applying the mixture followed by curing, or by applying and curing a mixture of the radiation-curable compound and antioxidant, coating or evaporating the lubricant onto the mixture film to form a lubricant coating or deposition. Application of these additives alone or in admixture may be carried out using a solvent. The additives may be evaporated or gas phase deposited by vaporizing them in air or inert gas or vacuum and directing the vapor to the surface of an object to be coated therewith. Application of the additives by evaporation is advantageous in producing a layer with a uniform or smooth surface, leading to improved output waveform.

The proportion of the radiation-curable compound having a molecular weight of less than 2,000, antioxidant, and lubricant used in the topcoat layer may be controlled such that the ratio of the radiation-curable compound to antioxidant ranges from 10:90 to 90:10, and preferably from 30:70 to 70:30 by weight. The lubricant may be added in amounts of from 0.5 to 100 parts by weight per 100 parts by weight of the radiation-curable compound plus antioxidant. Smaller amounts of the radiation-curable compound outside this range result in a topcoat layer which is less tough and liable to abrasion. Amounts of the antioxidant outside this range are too small to provide rust preventive effect. Then the ferromagnetic metal thin film tends to be corroded which in turn, causes damage to the topcoat layer, resulting in deteriorated electromagnetic properties as evidenced by an output drop. The topcoat layer may preferably have a thickness of 10 to 100 Å, and more preferably 10 to 50 Å. Too thick topcoats undesirably result in deteriorated electromagnetic properties and can be abraded away during operation. Too thin topcoats result in clogging of head gaps. The topcoat layer according to the present invention has many advantages attributable to the respective components. That is, the radiation-curable compound having a molecular weight of less than 2,000 reinforces the topcoat layer which experiences less abrasion; the antioxidant provides a sufficient rust preventive effect; and the lubricant serves to reduce the frictional resistance on the magnetic layer surface. These effects provide magnetic recording media with moving stability, durability or runnability, and reduced dropout. The anti-oxidant and the lubricant contained in the topcoat layer are both preferably of radiation curable type.

Radiation

Active energy radiation used for crosslinking may include electron radiation from a radiation source in the form of a radiation accelerator, $\gamma$-ray emitted from Co60, $\beta$-ray emitted from Sr90, X-ray emitted from an X-ray generator, and ultraviolet radiation. Particularly preferred radiation for exposure is radiation generated by a radiation accelerator because of simple incorporation in a manufacturing line and electromagnetic radiation shielding. In curing the topcoat layer through exposure to radiation, it is preferred to operate a radiation accelerator at an accelerating voltage of 100 to 750 kV, and preferably 150 to 300 kV to generate radiation having a sufficient penetrating power such that the object is exposed to a radiation dose of 0.5 to 20 megarad. In the practice of radiation curing according to the present invention, it is very advantageous to use a low dose type radiation accelerator (electrocurtain system) available from Energy Science Inc. of U.S.A. because it may be readily incorporated in a tape coating and fabricating line and internal shielding of secondary x-rays is complete. A van de Graaff type accelerator may equally be employed which have been widely used as a radiation accelerator in the proor art.

It is important in radiation crosslinking to expose the topcoat layer to radiation in a stream of an inert gas such as $N_2$ gas and He gas. Exposure to radiation in air is not desirable because $O_3$ generated by radiation exposure acts on the binder polymer to generate radicals therein which in turn, adversely affect the crosslinking reaction of the binder. It is thus important that the atmosphere where active energy radiation is irradiated be an atmosphere of an inert gas such as $N_2$, He and $CO_2$ having an oxygen concentration of 5% at the maximum.

A photo polymerization sensitizer may be added to the topcoat composition according to the present invention with the advantage of promoted ultraviolet curing. The photo polymerization sensitizers used herein may be selected from well-known sensitizers. Examples of such sensitizers include benzoins such as benzoin methyl ether, benzoin ethyl ether, $\alpha$-methylbenzoin, $\alpha$-chlorodeoxybenzoin, etc.; ketones such as benzophenone, acetophenone, bis(dialkylamino)benzophenones; quinones such as anthraquinone and phenanthraquinone; and sulfides such as benzyl sulfide, tetramethylthiuram monosulfide, etc. The photo polymerization sensitizers may be added in amounts of 0.1 to 10% by weight based on the resin solids.

Magnetic head

The magnetic recording medium of the present invention may be operated in combination with a variety of magnetic heads. It is preferred that at least a gap-defining edge portion of the magnetic head be of a magnetic metal material. It is possible to form a core entirely of a ferromagnetic metal material although a part of the core including a gap-defining edge portion may be formed of a ferromagnetic metal material. FIG. 2 schematically shows a magnetic head generally designated at 20 as comprising core halves 21 and 22 formed of a ferromagnetic material such as ferrite. The core halves 21 and 22 are metallized at their gap-defining edge portions with ferromagnetic metal material layers 31 and 32 of about 1 to 5 $\mu$m thick by sputtering or any suitable metallizing techniques. The core halves 21 and 22 are mated so as to define a gap 24 therebetween which is filled with glass or dielectric material and has a distance a. This configuration, although the figure is not drawn to exact proportion and shape, provides improved electromagnetic properties and ensures smooth tape passage thereacross without head adhesion or clogging. Of course, the shape and structure of the head is well known. In the practice of the present invention, it is desirable that the head gap 24 has a distance a of 0.1 to 0.5 $\mu$m, and preferably 0.1 to 0.4 $\mu$m, and a track width of to 50 $\mu$m, and preferably 10 to 20 $\mu$m.

The ferromagnetic metal materials used in the fabrication of the magnetic head may be selected from a variety of such materials including thin films and thin plates of amorphous magnetic metals, Sendust, hard Permalloy, Permalloy, etc. Among them, particularly preferred are amorphous magnetic Co-based alloys because they experience little head adhesion or clogging and have excellent electromagnetic properties. Preferred are amorphous magnetic alloys comprising 70 to 95 atom% of Co and 5 to 20 atom% of a vitrifying element(s) such as Zr, Nb, Ta, Hf, rare earth elements, Si, B, P, C, Al, etc., with the Zr and/or Nb being most preferred. Also preferred are alloys comprising 65 to 85 atom% of Co and 15 to 35 atom% of Si and/or B as a vitrifying element. The latter alloys may further contain less than 10 atom% of Fe, less than 25 atom% of Ni, less than 20 atom% (in total) of at least one member of Cr, Ti, Ru, W, Mo, Ti, Mn, etc. The amorphous agnetic alloys may be formed into core halves or gap-defining segments by sputtering or high speed quenching.

Recording/reproducing operation may be performed on the magnetic recording medium of the present invention by means of the above-mentioned magnetic head in accordance with any well-known video recording/reproducing systems including the so-called VHS, Beta, 8-mm video and U-standard systems. The magnetic recording medium and recording/reproducing method according to the present invention has a number of benefits.

The magnetic recording medium exhibits sufficiently reduced dynamic friction to provide stable movement.

Runnability is outstandingly improved so that the dynamic friction increases little after repeated travel cycles in a recording/reproducing equipment. The medium tolerates an increased number of recording/reproducing operations and offers improved still characteristics (characteristics in the still mode reproduction).

Improved stability ensures that the medium can be stored and operated in severely varying environments from high-temperature high-humidity to low-temperature low-humidity environments.

Reproduction output is little affected by a spacing loss and contains less noise.

The magnetic recording medium operated in contact with a head releases little materials which will adhere to and clog the head.

These benefits are further enhanced when the medium is used in combination with ferromagnetic metal heads, and particularly in the case of high density recording at a minimum recording wavelength of less than 1 μm.

EXAMPLES

Examples of the present invention are given below by way of illustration and not by way of limitation.

EXAMPLE 1

Colloidal silica was applied onto a substantially particulate-free smooth polyester film of 12 μm thick. There was obtained a substrate having submicron particles or protrusions distributed thereon at a density of about $10^7/mm^2$. The protrusions were as high as about 150 Å

(1) Formation of magnetic layer

Ferromagnetic thin film 1

The substrate was moved along the circumferential surface of a cooled cylindrical can in a chamber which was evacuated to a vacuum of $1.0 \times 10^{-4}$ Torr A 1:1 (by volume) mixture of $O_2$ and Ar was passed through the chamber at a flow rate of 800 cc/min. A 80/20 Co/Ni alloy was melted in the chamber and evaporated toward the substrate within the range of incident angle between 90° and 30° by the oblique evaporation technique. There was formed a Co—Ni—O thin film of 0.15 μm thick on the substrate.

Oxygen was locally concentrated at the interface with the substrate and the surface of the magnetic film remote from the substrate. The surface of the magnetic layer remote from the substrate was substantially completely covered with oxides. The magnetic film had a coercive force Hc=1,000 Oe. The average quantity of oxygen in the magnetic film was 40% as expressed by its atomic ratio to Co and Ni, that is, $O/(Co+Ni) \times 100$.

Ferromagnetic thin film 2

A ferromagnetic thin film 2 was prepared in the same manner as for ferromagnetic thin film 1 except that the substrate was moved along the circumferential surface of a cooled cylindrical can in a chamber which was evacuated to a vacuum of $5.0 \times 10^{-6}$ Torr There was formed a thin film consisting essentially of Co—Ni and having a thickness of 0.15 μm.

The resulting tape was forcedly oxidized in an atmosphere at 90° C. and RH 20% such that the surface of the magnetic film remote from the substrate consisted of oxides. The magnetic film had a coercive force Hc of 900 Oe. The average quantity of oxygen in the magnetic film was 45% as expressed by its atomic ratio to Co and Ni.

Ferromagnetic thin film 3 (comparison)

A ferromagnetic thin film 3 was prepared by the same evaporation process as for ferromagnetic thin film 1 except that the substrate was moved along the circumferential surface of a cooled cylindrical can in a chamber which was evacuated to a vacuum of $5.0 \times 10^{-6}$ Torr The oxidizing treatment with oxygen as done for ferromagnetic thin film 2 was omitted. There was formed a thin film consisting essentially of Co-i and having a thickness of 0.15 μm and a coercive force Hc=950 Oe.

(2) Formation of topcoat layer

|  | Parts by weight |
| --- | --- |
| Topcoat composition 1 | |
| 2,6-di-tert-butyl-p-cresol, | 1 |
| Pentaerythritol tetraacrylatae, MW 352 | 1.5 |
| Stearic acid | 0.1 |
| MEK (methyl ethyl ketone) | 100 |
| Topcoat composition 2 | |
| Monoglycol salicylate acrylate | 1 |
| Pentaerythritol tetraacrylate, MW 352 | 0.6 |
| N—vinylpyrrolidone, MW 111 | 0.3 |
| Myristic acid | 0.3 |
| Myristylalchol methacrylate | 1.0 |
| MEK/toluene 1/1 | 100 |
| Topcoat composition 3 | |
| Dimethylaminoethyl methacrylate | 1 |
| Trimethylpropane triacrylate, MW 296 | 0.6 |
| N—vinylpyrrolidone, MW 111 | 0.3 |
| Stearic acid | 0.1 |
| MEK/toluene 1/1 | 100 |

Preparation and nature of topcoat layer (1) Topcoat layer 1 was obtained by applying topcoat composition 1 onto the ferromagnetic thin film followed by exposure to radiation at an accelerating voltage of 150 keV and an electrode current of 6 mA to a dose of 3 Mrad in $N_2$ gas. The topcoat layer was 20 Å thick.

(2) Topcoat layer 2 was obtained by applying tocoat composition 2 onto the ferromagnetic thin film followed by exposure to radiation at an accelerating voltage of 150 keV and an electrode current of 6 mA to a dose of 3 Mrad in $N_2$ gas. The topcoat layer was 40 Å thick.

(3) Topcoat layer 3 was obtained by applying tocoat composition 3 onto the ferromagnetic thin film followed by exposure to radiation at an accelerating voltage of 150 keV and an electrode current of 10 mA to a dose of 5 Mrad in $N_2$ gas. The topcoat layer was 40 Å thick.

| | Topcoat composition 4 | Parts by weight |
| --- | --- | --- |
| (a) | Dimethylaminoethyl methacrylate | 1 |
| | N—vinylpyrrolidone, MW 111 | 2 |

| -continued | |
|---|---|
| Topcoat composition 4 | Parts by weight |
| MEK/toluene 1/1 | 100 |

Composition (a) was applied onto the ferromagnetic thin film and then exposed to radiation at an accelerating voltage of 150 keV and an electrode current of 10 mA to a dose of 5 Mrad in $N_2$ gas.

| (b) Stearylmethacrylate | 0.3 |
|---|---|
| Fluorine oil (telomerization process) | 0.2 |
| MEK | 100 |

Composition (b) was applied onto composition (a) and then exposed to radiation at an accelerating voltage of 150 keV and an electrode current of 4 mA to a dose of 2 Mrad in $N_2$ gas. The resulting topcoat layer was 50 Å thick.

Topcoat composition 5

Film segment (a) of topcoat composition 4 on the ferromagnetic thin film adsorbed stearyl alcohol in an atmosphere at $4 \times 10^{-3}$ Torr The resulting topcoat layer was 30 Å thick.

Topcoat composition 6

Film segment (a) of topcoat composition 4 on the ferromagnetic thin film adsorbed fluoride-modified oil in [20 an atmosphere at 4 x 10- Torr The resulting topcoat layer was 30 ° A thick.

Topcoat composition 7 (comparison)

Topcoat composition 7 is the same as topcoat composition 1 except that the radiation-curable compound having a molecular weight of less than 2,000 is omitted and the antioxidant is increased by an amount equal to that of the radiation-curable compound omitted.

Topcoat composition 8 (comparison)

Topcoat composition 8 is the same as topcoat composition 3 except that the radiation-curable compound having a molecular weight of less than 2,000 is omitted and the antioxidant is increased by an amount equal to that of the radiation-curable compound omitted. Magnetic recording media were prepared using these ferromagnetic thin films and topcoat layers as shown in Table 1 along with their properties.

The magnetic head used in examining the media was of the type shown in FIG. 2 and having a gap distance a of 0.25 μm and a track width of 20 μm. The core halves 21, 22 were formed of ferrite, gap-defining edge portions 31, 32 were amorphous layers of Co 0.8/Ni 0.1/Zr 0.1 (atomic ratio percent) formed by sputtering to a thickness of 3 μm, and the gap filler was glass. For the head of this size, the minimum protrusion distribution density $10^5/a^2$ is calculated to be $1.6 \times 10^6$.

A ferrite magnetic head of the same shape and size was also used for comparison purpose.

The measurement of various properties is described below.

Protrusion observation

Tape surface was observed under a scanning electron microscope (SEM) and a transmissive electron microscope (TEM).

Still life

Signals are recorded in tape at 5 MHz and the reproduced output is measured for still life. A continuous operation in still mode in excess of 10 minutes is acceptable.

Friction on magnetic layer side

A tape is partially wound around a cylinder such that the magnetic layer side is in contact with the cylinder. While a load of 20 g is applied to one end of the tape, the cylinder is rotated 90°. A change of tension is determined for friction measurement.

Output

Signals are recorded and reproduced at a frequency of 5 MHz to determine an S/N ratio (relative value). To this end, a commercially available VHS type video tape recorder is modified so as to make possible measurement up to 5 MHz.

Head clogging

A tape is moved 50 passes on a commercially available VHS type video tape recorder. It is observed how the head gap is clogged.

Head adhesion

A tape is moved predetermined passes on a commercially available VHS type video tape recorder. Then the head drum is removed and examined on the tape contacting surface under an optical microscope.

Topcoat abrasion

A tape is moved predetermined passes on a commercially available VHS type video tape recorder. Then the tape is observed under an optical microscope.

TABLE 1

| No. | Ferromagnetic thin film | Top coat | Head adhesion | Still life, min. | Properties (40° C., RH 60%, 50 passes) | | | |
|---|---|---|---|---|---|---|---|---|
| | | | | | Coefficient of friction | Topcoat abrasion | Head clogging | Output stability |
| 1 | 1 | 1 | slight | >10 | 0.21 | slight | slight | good |
| 2 | 1 | 2 | slight | >10 | 0.22 | slight | none | good |
| 3 | 1 | 3 | slight | >10 | 0.20 | none | none | good |
| 4 | 2 | 4 | slight | >10 | 0.21 | none | none | good |
| 5 | 2 | 5 | slight | >10 | 0.22 | slight | slight | good |
| 6 | 2 | 6 | slight | >10 | 0.21 | slight | slight | good |
| 7* | 3 | 1 | moderate | 1 | topcoat layer peeled off | | | |
| 8* | 1 | 7 | marked | >10 | 0.27 | marked | marked | poor |
| 9* | 1 | 8 | marked | >10 | 0.30 | marked | marked | poor |
| 10* | 2 | 7 | marked | >10 | 0.28 | marked | marked | poor |
| 11* | 2 | 8 | marked | >10 | 0.29 | marked | marked | poor |

*comparative example

EXAMPLE 2

Certain properties of magnetic recording tapes are shown in relation to the height and density of protrusions on the magnetic layer surface.

Experiments were carried out using signals having a minimum recording wavelength of 0.7 μm. The magnetic heads used were the same amorphous head as used in Example 1 and a ferrite head of the same shape and size.

The topcoat layer used was topcoat layer 2. The magnetic layer was formed in the same conditions as used for ferromagnetic thin film 1 in Example 1.

TABLE 2

| Sample No. | Protrusion height, Å | Protrusion density,/cm$^2$ | Reproducing Output, dB | Head clogging | Head type |
|---|---|---|---|---|---|
| 21 | 50 | $2 \times 10^8$ | +0.3 | slight | amorphous |
| 22 | 50 | $5 \times 10^9$ | −0.1 | slight | amorphous |
| 23 | 100 | $4 \times 10^8$ | −0.3 | none | amorphous |
| 24 | 100 | $5 \times 10^9$ | −0.3 | none | amorphous |
| 25 | 100 | $2 \times 10^{10}$ | −0.5 | none | amorphous |
| 26 | 200 | $3 \times 10^8$ | −0.5 | none | amorphous |
| 27 | 200 | $4 \times 10^9$ | −0.5 | none | amorphous |
| 28 | 200 | $3 \times 10^{10}$ | −0.6 | slight | amorphous |
| 29 | 300 | $2 \times 10^8$ | −0.4 | none | amorphous |
| 30 | 300 | $3 \times 10^9$ | −0.4 | none | amorphous |
| 31 | 300 | $3 \times 10^{10}$ | −0.6 | slight | amorphous |
| 32 | — | — | 0 | marked | amorphous |
| 33 | 1000 | $3 \times 10^8$ | −8.5 | marked | amorphous |
| 34 | 100 | $1 \times 10^7$ | −0.3 | slight | amorphous |
| 35 | 100 | $4 \times 10^8$ | −2.3 | marked | ferrite |
| 36 | 200 | $4 \times 10^9$ | −2.5 | marked | ferrite |
| 37 | 300 | $2 \times 10^8$ | −2.2 | marked | ferrite |
| 38 | 1000 | $3 \times 10^8$ | −11.5 | marked | ferrite |

All the ferromagnetic thin films in Examples were found by Auger spectroscopy to be covered with an oxide layer of 100 to 200 Å thick on their surface.

Although the foregoing Examples used colloidal silica as the inorganic submicron particles, equivalent results are obtained by using other submicron particles such as alumina sol, titanium black, zirconia, and various hydrosols.

In addition, equivalent results were obtained when a magnetic head formed of an amorphous Co—Fe—Ru—Cr—Si—B alloy was used. Rather less desirable results were obtained when a Sendust head was used.

What is claimed is:

1. A magnetic recording medium comprising:
   a flexible substraste having opposed major surfaces,
   a ferromagnetic metal thin film layer on one surface of the substrate primarily comprising cobalt,
   an organic topcoat layer on the surface of the metal thin film layer, and the magnetic recording medium being used in combination with a magnetic head having a gap, the improvement wherein
   said organic topcoat layer contains a radiationcurable compund having a molecular weight of less than 2,000, an anti-oxidant, and a lubricant,
   said metal thin film layer contains oxygen, and the medium has protrusions on its surface at an average density of at least $10^5/a^2$ per square millimeter of the surface, where a is the distance of the magnetic head gap as expressed in $\mu$m and is from 0.1 to 0.5 $\mu$m, said protrusions corresponding to the submicron paticles of a size of 30 to 300 Å within the medium, and said protrusions having a height of 30 to 300 Å.

2. A magnetic recording medium according to claim 1 wherein said flexible substrate is comprised of a high polymer, and the protrusions conform to submicron particles having a size of 30 to 300 Å which are placed on one surface of the substrate.

3. A magnetic recoridng medium according to claim 1 wherein said ferromagnetic metal thin film layer at the surface s covered with a ferromagnetic metal oxide coating.

4. A magnetic recording medium according to claim 1 wherein the anti-oxidant in the topcoat layer is comprised of a radiation curable anti-oxidant.

5. A magnetic reocridng medium according to claim 1 wherein the lubricant in the top coat layer is comprised of a radiation curable lubricant.

6. A magnetic recording medium according to claim 1 wherein said topcoat layer has a thickness of 10 to 100 Å

7. A method for conducting recording/reporducing operation on a magnetic recording medium comprising a flexible substrate havig opposed major surfaes, a ferromagnetic metal thin film layer on one surface of the substrate principally comprsiing cobalt, and an organic topcoat layer on the surface of the metal thin film layer, by passing the medium across a magnetic head having a gap, the improvement wherein
   said organic topcoat layer contains a radiation curable compound having a molecular weight of less than 2,000 an anti-oxidant, and a lubricant,
   said metal thin film layer contains oxygen, and
   the medium has in average at least $10^5/a^2$ protrusions per square millimeter of the surface, where a is the distance of the magnetic head gas as expressed in $\mu$m and is from 0.1 to 0 5 $\mu$m, said protrusions corresponding to submicron particles of a size of 30 to 300 Å within the medium, and said protrusions having a height of 30 to 300 Å.

8. A magnetic recording/reproducing method according to claim 7 wherein at least an edge portion of the magnetic head including the gap is formed of a ferromagnetic metal material.

9. A magnetic recording/reproducing method according to claim 7 wherein the ferromagnetic metal material is a magnetic amorphous cobalt base alloy.

* * * * *

UNITED STATES PATENT AND TRADEMARK OFFICE
CERTIFICATE OF CORRECTION

PATENT NO. : 4,828,899
DATED : May 9, 1989
INVENTOR(S) : Hiroyuki Arioka et al

It is certified that error appears in the above-identified patent and that said Letters Patent is hereby corrected as shown below:

Column 22, line 12, change "recoridng" to --recording-- line 19, change "reocridng" to --recording-- line 25, change "reporducing" to --reproducing-- line 27, change "havig" to --having-- line 27, change "surfaes" to --surfaces-- line 29, change "comprsiing" to --comprising--

Signed and Sealed this

Twenty-fourth Day of July, 1990

Attest:

HARRY F. MANBECK, JR.

Attesting Officer

Commissioner of Patents and Trademarks